No. 887,400. PATENTED MAY 12, 1908.
F. C. KISER & J. B. HASLINGER.
SCISSORS OR SHEARS.
APPLICATION FILED MAY 24, 1906.

Witnesses
J. G. Hinkel
J. J. McCarthy

Inventors
Frank C. Kiser
John B. Haslinger
by Foster Freeman Watson
Attorneys

THE NORRIS PETERS CO., WASHINGTON, D. C.

UNITED STATES PATENT OFFICE.

FRANK C. KISER AND JOHN B. HASLINGER, OF FREMONT, OHIO.

SCISSORS OR SHEARS.

No. 887,400.     Specification of Letters Patent.     Patented May 12, 1908.

Application filed May 24, 1906. Serial No. 318,535.

*To all whom it may concern:*

Be it known that we, FRANK C. KISER and JOHN B. HASLINGER, citizens of the United States, residing at Fremont, in the county of Sandusky and State of Ohio, have invented certain new and useful Improvements in Scissors or Shears, of which the following is a specification.

Our invention relates to scissors or shears, and has for its object to insure the meeting and shearing action of the cutting edges of the shears, to which end we make use of one or more strips, preferably spring strips, arranged to each bear upon the cutting portion of one blade of the shears ahead of the pivot and against the handle portion of the other blade, as fully set forth hereinafter, and as illustrated in the accompanying drawings, in which,—

Figure 1:
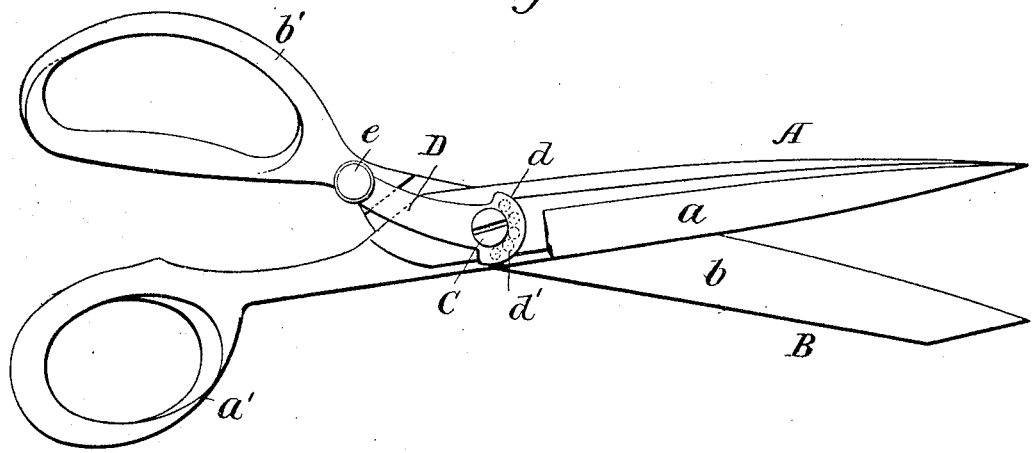
Figure 2:
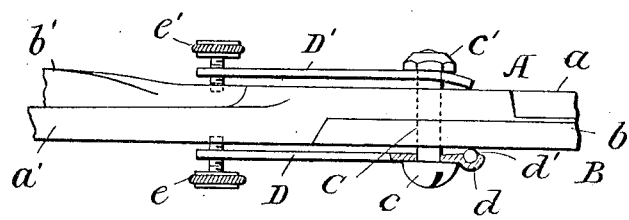

Figure 1 is a side view of a pair of scissors, embodying our improvement; and Fig. 2 an edge view.

The scissors or shears consist, as usual, of the two blades A, and B connected by a pivot C, the blade A having the cutting protion $a$ and the handle portion $a'$, and the blade B having the cutting portion $b$ and the handle portion $b'$. With these parts is combined a spring, or in some instances two springs, each so arranged as to bear upon the cutting portion of one blade and on the handle portion of the other in a manner to bring the cutting portions of both the blades together to insure a good shearing effect.

As shown, a strip D, preferably of spring metal, is perforated for the passage of the pivot C, against the head $c$ on which the strip bears, the said spring extending for a short distance forward beyond the pivot pin and bearing upon the cutting portion $a$ of the blade A, while the long arm of the strip extends in the opposite direction and bears against the side of the handle portion $b'$ of the blade B. It will be seen that the action of the strip, especially when it is spring-like, is to force the cutting part $a$ of the blade A towards the opposite blade, and the cutting part $b$ of the blade B towards the part $a$.

In order that the effect of the strip D may be varied, we make use of a set screw $e$ by means of which the spring action or pressure may be regulated. Thus, as shown in Fig. 2, the set screw extends through the strip D and bears upon the side of the handle portion $b'$. In some instances, especially with heavy shears, it may be desirable to increase the effect which may be done, as shown in Fig. 2, by using two strips, the additional strip D' being shown as provided with a set screw $e'$ and bearing against a head $c'$ at the end of the pivot. In some instances, and especially with heavy scissors or shears, it is desirable to provide anti-friction devices between the end of the strip and the body of the blade, and we have shown one end of the strip D as shaped to form a pocket or recessed bearing $d$ to receive one or more anti-friction devices as balls $d'$, and by the use of this we can obtain any desired amount of pressure upon the cutting edges of the shears without materially interfering with their operation.

Without limiting ourselves to the precise construction and arrangement of parts shown, we claim:

1. The combination with the blades of a scissors, of a connecting pivot having a head out of contact with the face of the adjacent blade, and a spring bearing on the inside of said head as a fulcrum and extending forward of the pivot and bearing at its end only, beyond said pivot, on the outer face of the adjacent blade, and extending to the rear of the pivot and provided with an adjustable bearing at its rear end upon the inner face of the other blade.

2. The combination with the blades and connecting pivot of a scissors, of a spring plate bearing at the inside of the head of the pivot, extending forward of the pivot, and a series of anti-friction rolls arranged between the adjacent faces of the blade and the plate at the forward end of the latter, the other end of the plate extending to the rear and bearing upon the other blade.

In testimony whereof we affix our signatures in presence of two witnesses.

FRANK C. KISER.
        JOHN B. HASLINGER.

Witnesses:
  HARRY ZIMMERMAN,
  A. M. OBERHAUSER.